United States Patent [19]

Kuntze-Fechner et al.

[11] Patent Number: 4,690,615
[45] Date of Patent: Sep. 1, 1987

[54] ROTOR, ESPECIALLY FOR ROTARY WING AIRCRAFT

[75] Inventors: Gerald Kuntze-Fechner, Bad Wiessee; Otmar Friedberger, Neubiberg; Michael Hahn, Ottobrunn, all of Fed. Rep. of Germany

[73] Assignee: Messerschmitt-Boelkow-Blohm Gesellschaft mit beschraenkter Haftung, Munich, Fed. Rep. of Germany

[21] Appl. No.: 903,024

[22] Filed: Sep. 2, 1986

[30] Foreign Application Priority Data

Oct. 1, 1985 [DE] Fed. Rep. of Germany ....... 3534968

[51] Int. Cl.$^4$ .............................................. B64C 27/33
[52] U.S. Cl. ................................. 416/134 A; 416/141
[58] Field of Search .......... 416/134 A, 138 A, 140 A, 416/141

[56] References Cited

U.S. PATENT DOCUMENTS

| 4,012,169 | 3/1977 | Mouille et al. | 416/134 A |
| 4,129,403 | 12/1978 | Watson | 416/134 A |
| 4,222,709 | 9/1980 | Mouille | 416/141 X |
| 4,273,511 | 6/1981 | Mouille et al. | 416/134 A |
| 4,547,127 | 10/1985 | Frommlet et al. | 416/134 A |

FOREIGN PATENT DOCUMENTS

| 3412592 | 10/1985 | Fed. Rep. of Germany | 416/102 |
| 2457417 | 1/1981 | France | 416/138 A |

Primary Examiner—Everette A. Powell, Jr.
Attorney, Agent, or Firm—W. G. Fasse; D. H. Kane, Jr.

[57] ABSTRACT

A rotor, especially for rotary wing aircraft, has a rotor hub (1) with one or more torsionally stiff rotor hub arms (1.1) projecting radially outwardly. A rotor blade (2) having a blade root (2.1), a blade wing section (2.3), and a torsionally flexible blade neck (2.2) is attached by bolts (3) to each rotor hub arm (1.1). A torsionally rigid blade angle control sleeve (5) extends without contact along each blade neck (2.2) and is rigidly connected at its radially outer end to the blade wing section (2.3) and is movably connected at the radially inner end to the blade root (2.1). In order to isolate the blade control from any blade flapping movements, and to reduce the distance between the flapping hinge point and the rotor hub (1), the rotor hub arm (1.1) is flat in a direction perpendicular to the blade rotation plane and is more flexible to blade flapping movements than the blade neck (2.2) is. The blade root (2.1) is in the form of a yoke or fork for attachment to the rotor hub arm (1.1), whereby the two shanks or prongs (2.1.1) of the yoke or fork form the base for the movable support of the blade control sleeve (5).

10 Claims, 3 Drawing Figures

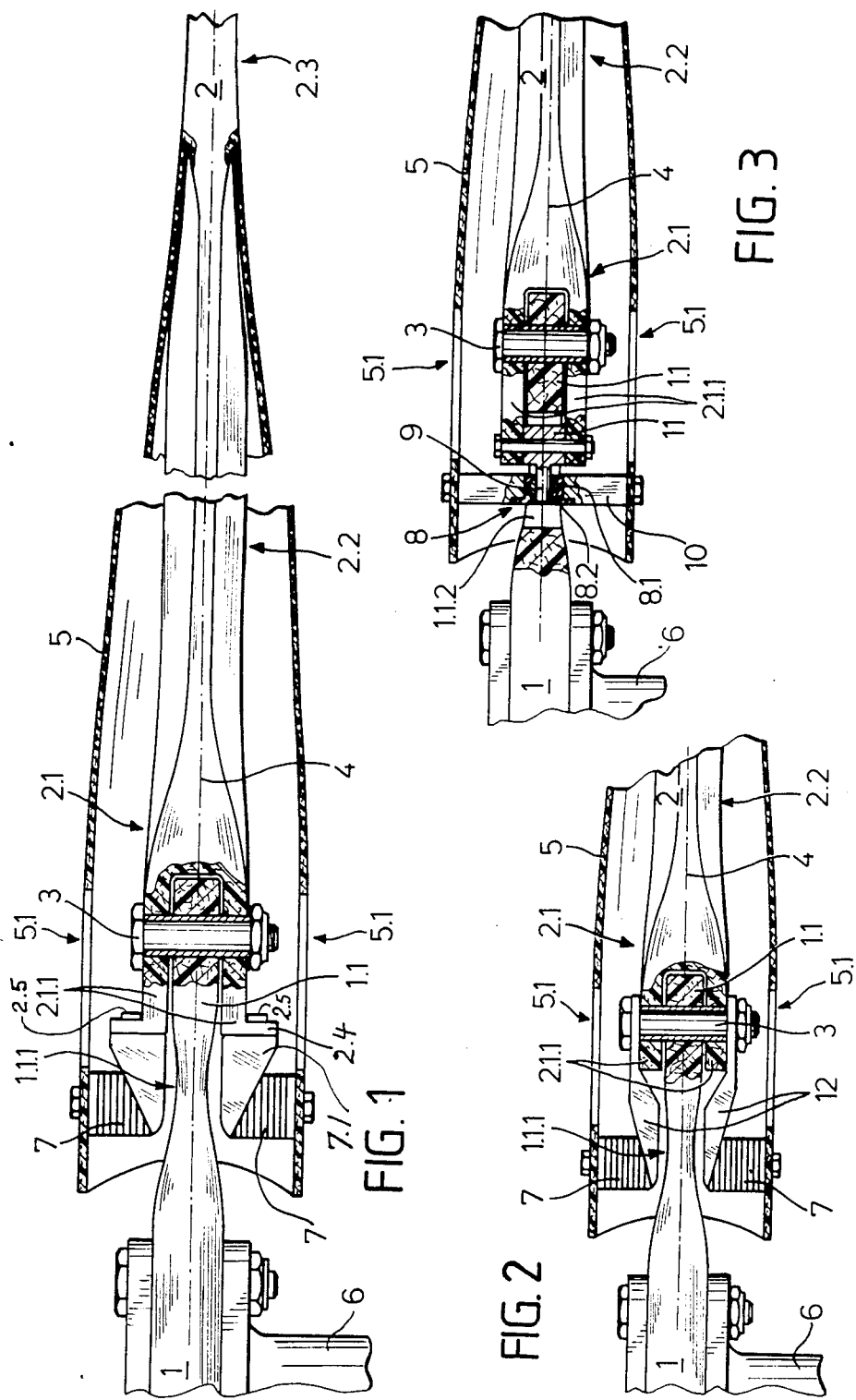

ROTOR, ESPECIALLY FOR ROTARY WING AIRCRAFT

FIELD OF THE INVENTION

The invention relates to a rotor structure, especially for rotary wing aircraft, having one or more torsionally stiff rotor hub arms attached to and extending radially outwardly from the rotor hub. A respective rotor blade is attached to each torsionally stiff rotor hub arm. Each rotor blade includes a blade root, a torsionally yielding blade neck, and a blade wing section.

DESCRIPTION OF THE PRIOR ART

In prior art helicopter rotors the blade neck is arranged between the blade root and the blade wing section and must be yielding to torsion applied to the blade wing section for allowing blade pitch angle adjustment movements. Each blade root is connected to the respective rotor hub arm by means of a bolt passing through the blade root and the rotor hub arm. A torsionally stiff blade control sleeve extending without contact along the blade neck is provided for adjusting the blade pitch angle. One end of the blade control sleeve is rigidly connected to the blade wing section, whereas the other end of the blade control sleeve is movably supported by the blade root.

Such a rotor is known from German Patent Publication (DE-OS) No. 3,241,754 and it must be expected that the blade neck is subject to bending, for example, due to flapping movements of the blade wing section. The reactive effect on blade control of these blade flapping bending movements of the blade neck are largely prevented, but are not completely eliminated, by means of the movable support of the blade control sleeve on the blade root. The blade bending movements occur at a fictitious or effective hinging point in the elastic region of the blade neck. The distance between this fictitious flapping hinge and the rotor rotation axis is relatively large, so that considerable bending moment loads are applied to the rotor pylon and shaft. Therefore a high strength and stiffness is required of the rotor structure, whereby a reduction of the structural weight of the rotor is hindered.

A rotor hub arm having a flexible neck portion is, for example, 10 known from U.S. Pat. No. 4,129,403, wherein the flexible structure simply serves to avoid the need of providing separate blade flapping hinges. The flexible rotor arm portion does not serve to substantially shift the blade flapping hinge, nor to isolate the blade control sleeve from bending forces arising from the blade flapping movements.

OBJECTS OF THE INVENTION

In view of the foregoing it is the aim of the invention to achieve the following objects singly or in combination:

to more completely eliminate or at least substantially reduce the effects of the blade flapping movements in a rotor structure for rotary wing aircraft;

to reduce adverse feedback effects caused by blade flapping movements, onto the blade control, especially the blade angle adjustment control;

to reduce the distance between the effective, fictitious flapping hinges and the rotational rotor axis by moving these fictitious flapping hinges relatively close to the rotor hub, or rather to the rotational axis of the rotor hub;

to avoid high bending moments on the rotor shaft and pylon due to such flapping movements of the blade, thereby allowing an advantageously light, yet stable structure of the rotor;

to move the fictitious flapping hinges out of the blade neck into a rotor hub arm; and to shape the blade angle control sleeve relatively flat to achieve an aerodynamically advantageous configuration.

SUMMARY OF THE INVENTION

The above objects have been achieved in a rotor structure for rotary wing aircraft according to the invention, wherein each rotor blade is connected to the rotor hub through a rotor arm having a cross-sectional profile which is relatively flat in a direction perpendicular to the rotor or blade rotation plane. The relatively flat portion of each rotor hub arm is more flexible or yielding to flapping movements than the blade neck is. The blade root is connected to the rotor hub arm by a fork or yoke forming a portion of the blade root, whereby two yoke shanks or fork prongs provide either directly or indirectly a movable support for the blade angle control sleeve relative to the blade root.

In a practical embodiment of the invention the fictitious effective blade flapping hinges are shifted out of the blade neck into the respective rotor hub arm. This may be achieved for example, preferably by providing a narrow necked portion in the rotor hub arm between the rotor hub and the blade root, whereby this necked portion exhibits a greater flexibility for flapping movements.

The fork or yoke-shaped end of the blade root according to the invention forms part of first connecting means between the rotor hub arms and the blades and allows second connecting means, which movably support the blade angle control sleeve, to be shifted close to the rotor hub, so that these second connecting means may be positioned in the region of the fictitious blade flapping hinge point, whereby the blade angle control sleeve is substantially isolated from or free of any bending forces arising from the blade flapping movements.

BRIEF DESCRIPTION OF THE DRAWINGS

In order that the invention may be clearly understood, it will now be described, by way of example, with reference to the accompanying drawings, wherein:

FIG. 1 is a vertical lengthwise or rather radial section through a rotor blade, with special emphasis on the connection of the blade root to the rotor hub arm and to the blade angle control sleeve;

FIG. 2 is a view similar to that of FIG. 1, but showing a different embodiment of the connection between the blade root and the rotor hub arm and between the blade root and the blade angle control sleeve; and FIG. 3 is a view similar to that of FIG. 1, but showing a further embodiment of the rotor structure according to the invention.

DETAILED DESCRIPTION OF PREFERRED EXAMPLE EMBODIMENTS AND OF THE BEST MODE OF THE INVENTION

Due to the similarity of FIGS. 1 to 3, the general structure of the present rotor will be described with reference to FIG. 1. A rotor hub 1 which is, for example, made of fiber-reinforced synthetic material, comprises one or more torsionally stiff rotor hub arms 1.1 which extend radially outwardly. A rotor blade 2, preferably made of the same fiber reinforced material, is connected to each rotor hub arm 1.1. A blade root 2.1 of each blade 2 is connected to the respective rotor hub arm 1.1 by first connecting means including two bolts 3 passing through holes bored through the blade root 2.1 in the direction of the blade root thickness and through the rotor hub arm 1.1.

For allowing the rotor blade 2, or rather its blade wing section 2.3, to carry out blade pitch angle adjustment movements about the blade pitch axis 4 with such a rigid bolted blade connection, a torsionally yielding blade neck 2.2 is provided between the blade root 2.1 and the blade wing section 2.3. The desired torsional flexibility is achieved by means of the unidirectional orientation of fibers in the blade lengthwise direction along the relatively long structure of the blade neck 2.2.

Due to the long structure of the blade neck 2.2, a torsionally stiff blade angle control sleeve 5 is provided for the blade pitch angle adjustment control. A yoke-shaped control lever not shown, is rigidly attached to the control sleeve 5, in order to achieve pitch angle adjustments of the blade wing section 2.3 about the blade pitch angle axis 4 in a known manner. Second connecting means, to be described below in more detail, connect the radially inner end of the blade angle control sleeve to the blade root in a movable manner. Third connecting means connect the blade angle control sleeve 5 in a torsionally rigid manner to the blade wing section 2.3. This third connecting means may result from the curing of the resin forming a matrix in which the fibers of the blade and of the sleeve 5 are embedded. The sleeve 5 extends without contact along the blade neck 2.2 to the rotor hub 1.

A support or mounting of the blade angle control sleeve 5 which merely allows rotation relative to the blade root 2.1 would be insufficient, because such a support would not prevent the reactive effects of blade lengthwise expansions and of bending of the blade neck 2.2 especially due to blade flapping movements on the blade control sleeve 5. Therefore, the second connecting means between the blade root 2.1 and the blade control sleeve 5 allows rotational-, angular-, and lengthwise-movements of the blade angle control sleeve 5 relative to the blade root 2.1. Even such movability of the blade angle control sleeve 5 by itself may not completely protect the blade angle control sleeve 5, and therewith the blade control, against reactive effects of blade flapping and bending of the blade neck 2.2. Such protection is practically only achievable by preventing the corresponding bending movements of the blade neck 2.2. It is necessary for this prevention that the rotor hub arm 1.1 comprises a cross-sectional profile which is flat perpendicular to the rotor or blade rotation plane. Furthermore, the rotor hub arm 1.1 must be more flexible to flapping bending movements than the blade neck 10 2.2 is, which is relatively flexurally stiff against bending, but yielding to torque moments. For example, the blade neck 2.2 may have a cross-shaped cross-sectional profile. This flat cross-sectional shape of the rotor hub arm 1.1 still permits the lead-lag movement of the blade, since these lead-lag movements are transmitted by the blade neck due to the cross-shape of the blade neck 2.2.

The flat cross-sectional shape of the rotor hub arm 1.1 simultaneously has the additonal advantage that the distance between the effective or fictitious flapping hinges and the rotor shaft 6 may be reduced to a minimum. For this purpose the rotor hub arm 1.1 as shown in FIGS. 1 and 2 becomes thinner in a direction perpendicular to the blade rotation plane, at a necked portion 1.1.1 near the middle of the rotor hub arm 1.1. The portion 1.1.1 exhibits an increased flexibility to flapping movements. In order to achieve the above named object of isolating the blade control from any reactive effects, the portion 1.1.1 of the rotor hub arm 1.1 functions as an effective fictitious blade flapping hinge. The second connecting means which ensure the movable support of the blade angle control sleeve 5 against the blade root 2.1 are positioned near this flapping hinge. This positioning of the second connecting means requires the yoke or fork shape of the blade root 2.1 as shown. The two yoke shanks or fork prongs 2.1.1 form part of the blade root 2.1 and the base for the movable support of the blade angle control sleeve 5. Thus, as seen in FIGS. 1 and 2, an elastomer bearing 7 forming part of the second connecting means may be separately provided as a bearing means on each side of each rotor hub arm 1.1. An elastomer bearing 7 is provided for each yoke shank or prong 2.1.1, whereby the two elastomer bearings 7 are arranged symmetrically about the rotor rotation plane or about the blade pitch axis 4.

However, it is also possible as shown in FIG. 3 to provide a journal bearing 8, for example, made of metal, as the bearing forming part of the second connecting means in a hole 1.1.2 of the rotor hub arm 1.1. The articulated journal bearing 8 comprises a pin 9 arranged coaxially with the blade pitch axis 4 and a ball member 8.1 which is slidable coaxially lengthwise on the pin 9. The outer socket ring 8.2 of the journal bearing 8 may, for example, be connected to the blade angle control sleeve 5 by means of a two-armed strut 10, while the pin 9 may be an extension of a spacer block 11 arranged between the two yoke shanks or fork prongs of the blade root 2.1.1. However, the arrangement may be reversed in that the pin 9 is connected to the strut 10 and the bearing 8 is connected to the spacer 11 and thus to the blade root.

Furthermore, it should be noted that the protrusion of the yoke shanks or fork prongs 2.1.1 beyond the blade connecting bolts 3 to the above described bearing means as shown in FIGS. 1 and 3, is not absolutely necessary. The spacing between the yoke shanks or fork prongs 2.1.1 and the bearing means may just as well be bridged by connecting arms 12 as shown in FIG. 2. A further advantageous detail may be seen in the drawings, wherein an access hole 5.1 is provided in the blade angle control sleeve 5 for easily accessing the blade attachment bolts 3. Incidentally, in FIG. 1, the fork prongs 2.1.1 have flanges 2.4 connected to extensions 7.1 of said elastomer bearings 7 by screws 2.5.

It is an advantage of the invention that the blade angle control sleeve 5 of the present rotor structure has a relatively flat, or in other words, an aerodynamically favorable cross-sectional profile. Furthermore, with the arrangement of the bearing means 7, 7.1 as described with reference to FIGS. 1 and 2, the rotor blades 2 may be rotated or folded into a so-called folded position after the removal of one of the two blade attachment bolts 3 from each rotor blade root 2.1, which is facilitaed by the holes 5.1.

Although the invention has been described with reference to specific example embodiments, it will be appreciated, that it is intended to cover all modifications and equivalents within the scope of the appended claims.

What we claim is:

1. A rotor structure, especially for rotary wing aircraft, comprising rotor blade means having a blade pitch axis and defining a rotation plane in which said rotor blade means rotate, a rotor hub having a rotational axis, said rotation plane extending substantially perpendicularly to said rotational axis, torsionally rigid rotor hub arm means projecting radially outwardly from said rotor hub, first means for connecting said rotor blade means to said rotor hub arm means, said rotor blade means comprising a blade root, a blade wing section, and a torsionally yielding blade neck arranged between said blade root and said blade wing section, said blade neck having a given first bending flexibility relative to blade flapping bending movements, torsionally rigid blade angle control sleeve means having a radially outer end and a radially inner end and extending without contact substantially coaxially along said blade neck, second means for movably connecting said radially inner end of said blade angle control sleeve to said blade root, and third means for rigidly connecting said radially outer end of said blade control sleeve to said blade wing section, said rotor hub arm means comprising a flattened section (1.1.1) having a second bending flexibility which is larger than said given first bending flexibility so that said blade flattened section is softer relative to blade flapping than said neck, said flattened section (1.1.1) comprising a cross-sectional profile which is flat in a direction substantially perpendicularly to said rotation plane, said first means for connecting said rotor blade means to said rotor hub arm means comprising fork means forming part of said blade root and further means for connecting said fork means to said rotor hub arm means, and wherein said second means for movably connecting said radially inner end of said blade angle control sleeve to said blade root are connected to said fork means.

2. The rotor structure of claim 1, wherein said fork means comprise two prongs, said hub arm means reaching into a space between said two prongs, wherein said first connecting means comprise bolt means passing through said two prongs and through said hub arm means, and wherein said second connecting means include by an extension of each of said two prongs.

3. The rotor structure of claim 1, wherein said flattened section of said rotor hub arm means comprises a necked portion between said rotor hub and said blade root, said necked portion getting narrower radially outwardly in a direction perpendicular to said rotation plane, whereby said second bending flexibility also increases radially outwardly from said rotor hub.

4. The rotor structure of claim 1, wherein said second connecting means for movably connecting said radially inner end of said blade angle control sleeve to said blade root, are arranged between said rotor hub and said blade root.

5. The rotor structure of claim 4, wherein said second connecting means comprise elastomer bearings arranged symmetrically relative to said rotation plane above and below of said rotor hub arm means, said fork means comprising two prongs, whereby an elastomer bearing is provided for each of said prongs of said fork means forming part of said blade root.

6. The rotor structure of claim 1, wherein said second connecting means comprise articulated journal bearing means including a journal pin arranged coaxially with said blade pitch axis, a ball member coaxially slidable on said journal pin, a socket ring enclosing said ball member, strut means connecting said blade angle control sleeve to said socket ring, means securing said journal pin to said fork means, whereby said journal pin is secured to said blade root and said socket ring is connected to said blade angle control sleeve, and wherein said rotor hub arm means further comprise a hole in which said articulated journal bearing means are arranged.

7. The rotor structure of claim 6, wherein said strut means comprise two strut members for connecting said socket ring to said blade angle control sleeve, said fork means comprising two prongs, and wherein said securing means comprise a spacer block arranged between said two prongs, whereby said journal pin is connected to said blade root and forms an extension of said spacer block.

8. The rotor structure of claim 1, wherein said fork means comprise two shanks forming blade root extensions reaching radially inwardly and connected to said second connecting means.

9. The rotor structure of claim 1, wherein said fork means comprise two prongs, said second connecting means comprising bearing support members attached to said two prongs forming extensions of said blade root.

10. The rotor structure of claim 1, wherein said second connecting means comprise articulated journal bearing means including a journal pin arranged coaxially with said blade pitch axis, a ball member coaxially slidable on said journal pin, a socket ring enclosing said ball member, strut means connecting said blade angle control sleeve to said journal pin, means securing said socket ring to said fork means, whereby said journal pin is connected to said blade angle control sleeve and said socket ring is secured to said blade root, and wherein said rotor hub arm means comprise a hole in which said articulated journal bearing means are arranged.

* * * * *